(12) United States Patent
Czaplicki

(10) Patent No.: US 11,248,145 B2
(45) Date of Patent: Feb. 15, 2022

(54) STRUCTURAL ADHESIVES

(75) Inventor: Michael Czaplicki, Rochester Hills, MI (US)

(73) Assignee: Zephyros, Inc., Romeo, MI (US)

(*) Notice: Subject to any disclaimer, the term of this patent is extended or adjusted under 35 U.S.C. 154(b) by 125 days.

(21) Appl. No.: 12/936,777

(22) PCT Filed: Apr. 7, 2009

(86) PCT No.: PCT/EP2009/002546
§ 371 (c)(1),
(2), (4) Date: Dec. 3, 2010

(87) PCT Pub. No.: WO2009/124709
PCT Pub. Date: Oct. 15, 2009

(65) Prior Publication Data
US 2011/0098382 A1    Apr. 28, 2011

(30) Foreign Application Priority Data
Apr. 9, 2008 (GB) ..................... 0806434

(51) Int. Cl.
| C09J 5/06 | (2006.01) |
| C08G 59/18 | (2006.01) |
| C09J 163/00 | (2006.01) |
| C09J 171/00 | (2006.01) |
| C08L 71/00 | (2006.01) |
| C09J 11/04 | (2006.01) |
| C09J 11/08 | (2006.01) |
| C08L 63/00 | (2006.01) |

(52) U.S. Cl.
CPC .............. *C09J 5/06* (2013.01); *C08G 59/186* (2013.01); *C09J 163/00* (2013.01); *C09J 171/00* (2013.01); *C08G 2650/56* (2013.01); *C08L 71/00* (2013.01); *C08L 2666/02* (2013.01); *C08L 2666/22* (2013.01); *C09J 2400/163* (2013.01)

(58) Field of Classification Search
None
See application file for complete search history.

(56) References Cited

U.S. PATENT DOCUMENTS

| 3,707,583 A | 12/1972 | McKown |
| 3,860,541 A | 1/1975 | Lehmann et al. |
| 3,944,631 A | 3/1976 | Yu et al. |
| 3,984,497 A | 10/1976 | Owens et al. |
| 3,985,703 A | 10/1976 | Ferry et al. |
| 4,034,013 A | 7/1977 | Lane |
| 4,096,202 A | 6/1978 | Farnham et al. |
| 4,138,462 A | 2/1979 | Procida et al. |
| 4,304,709 A | 12/1981 | Hooker et al. |
| 4,306,940 A | 12/1981 | Baer |
| 4,427,481 A | 1/1984 | Smith et al. |
| 4,495,324 A | 1/1985 | Chacko et al. |
| 4,536,436 A | 8/1985 | Maeko et al. |
| 4,538,380 A | 9/1985 | Colliander |
| 4,601,769 A | 7/1986 | DeHoff |
| 4,693,775 A | 9/1987 | Harrsion et al. |
| 4,724,243 A | 2/1988 | Harrison et al. |
| 4,749,434 A | 6/1988 | Harrison |
| 4,769,166 A | 9/1988 | Harrison |
| 4,778,845 A | 10/1988 | Tschan et al. |
| 4,833,191 A | 5/1989 | Bushway et al. |
| 4,871,590 A | 10/1989 | Merz et al. |
| 4,898,630 A | 2/1990 | Kitoh et al. |
| 4,908,273 A | 3/1990 | Urech et al. |
| 4,922,596 A | 5/1990 | Wycech |
| 4,923,902 A | 5/1990 | Wycech |
| 4,978,562 A | 12/1990 | Wycech |
| 4,985,703 A | 1/1991 | Kaneyama |
| 4,995,545 A | 2/1991 | Wycech |
| 5,030,701 A | 7/1991 | Johnson et al. |
| 5,074,913 A | 12/1991 | Trivett |
| 5,124,186 A | 6/1992 | Wycech |
| 5,164,472 A | 11/1992 | White et al. |
| 5,266,133 A | 11/1993 | Hanley et al. |
| 5,266,610 A | 11/1993 | Malhotra et al. |
| 5,274,006 A | 12/1993 | Kagoshima et al. |
| 5,275,853 A | 1/1994 | Silvis et al. |
| 5,342,873 A | 8/1994 | Merz et al. |
| 5,344,208 A | 9/1994 | Bien et al. |
| 5,382,078 A | 1/1995 | Lanteri |

(Continued)

FOREIGN PATENT DOCUMENTS

| CA | 2425414 A1 | 4/2002 |
| DE | 3838655 A1 | 5/1990 |

(Continued)

OTHER PUBLICATIONS

Stevenson, Janie C., "Impact modifiers: Providing a boost to impact performance," Journal of Vinyl and Additive Technology vol. 1, Issue 1, Mar. 1995, pp. 41-45.*
European Office Action dated Oct. 4, 2012 (Appln. No. 09729501.8).
Japanese Office Action dated Jul. 23, 2014; Application No. 2011-503370.
European Office Action dated Sep. 24, 2014 (Application No. 09729501.8).
Korean Office Action dated Aug. 20, 2015; Application No. 10-2010-7025154.
Notice of Opposition against European Patent EP2268752B1, dated Jun. 7, 2017.

(Continued)

*Primary Examiner* — Randy P Gulakowki
*Assistant Examiner* — Ha S Nguyen
(74) *Attorney, Agent, or Firm* — The Dobrusin Law Firm, P.C.

(57) ABSTRACT

An adhesive formulation comprising i) an adduct of an epoxy resin and an elastomer, ii) a phenoxy resin; iii) a core/shell polymer; iv) a curing agent which provides a structural adhesive with improved low temperature impact strength particularly useful for bonding metal especially in the automotive industry.

21 Claims, No Drawings

(56) References Cited

U.S. PATENT DOCUMENTS

| | | |
|---|---|---|
| 5,382,606 A | 1/1995 | Butikofer |
| 5,401,814 A | 3/1995 | Schomaker et al. |
| 5,464,924 A | 11/1995 | Silvis et al. |
| 5,470,886 A | 11/1995 | Makhlouf et al. |
| 5,475,039 A | 12/1995 | Butikofer |
| 5,506,025 A | 4/1996 | Otto et al. |
| 5,575,526 A | 11/1996 | Wycech |
| 5,648,401 A | 7/1997 | Czaplicki et al. |
| 5,649,400 A | 7/1997 | Norimichi |
| 5,708,042 A | 1/1998 | Hasegawa |
| 5,712,317 A | 1/1998 | Makhlouf et al. |
| 5,725,272 A | 3/1998 | Jones |
| 5,755,486 A | 5/1998 | Wycech |
| 5,766,719 A | 6/1998 | Rimkus |
| 5,783,272 A | 7/1998 | Wong |
| 5,834,078 A | 11/1998 | Cavitt et al. |
| 5,884,960 A | 3/1999 | Wycech |
| 5,894,071 A | 4/1999 | Merz et al. |
| 5,911,932 A | 6/1999 | Dyksterhouse |
| 5,931,474 A | 8/1999 | Chang et al. |
| 5,932,680 A | 8/1999 | Heider |
| 5,948,508 A | 9/1999 | Pastore et al. |
| 5,962,093 A | 10/1999 | White et al. |
| 5,964,979 A | 10/1999 | George et al. |
| 5,985,435 A | 11/1999 | Czaplicki et al. |
| 5,994,422 A | 11/1999 | Born et al. |
| 5,997,077 A | 12/1999 | Siebels et al. |
| 6,004,425 A | 12/1999 | Born et al. |
| 6,006,484 A | 12/1999 | Geissbuehler |
| 6,033,300 A | 3/2000 | Schneider |
| 6,040,350 A | 3/2000 | Fukui |
| 6,057,382 A | 5/2000 | Karim et al. |
| 6,068,922 A | 5/2000 | Vercesi et al. |
| 6,077,884 A | 6/2000 | Hess et al. |
| 6,093,358 A | 7/2000 | Schiewe et al. |
| 6,096,791 A | 8/2000 | Born et al. |
| 6,103,341 A | 8/2000 | Barz et al. |
| 6,103,784 A | 8/2000 | Hilborn et al. |
| 6,111,015 A | 8/2000 | Eldin et al. |
| 6,131,897 A | 10/2000 | Barz et al. |
| 6,133,335 A | 10/2000 | Mahoney et al. |
| 6,135,541 A | 10/2000 | Geise et al. |
| 6,136,398 A | 10/2000 | Willett et al. |
| 6,136,944 A | 10/2000 | Stewart et al. |
| 6,146,565 A | 11/2000 | Keller |
| 6,150,428 A | 11/2000 | Hanley et al. |
| 6,153,302 A | 11/2000 | Karim et al. |
| 6,162,504 A | 12/2000 | Hubert et al. |
| 6,174,932 B1 | 1/2001 | Pachl et al. |
| 6,180,715 B1 | 1/2001 | Schmidt |
| 6,228,449 B1 | 5/2001 | Meyer |
| 6,232,433 B1 | 5/2001 | Narayan |
| 6,235,842 B1 | 5/2001 | Kuwano et al. |
| 6,263,635 B1 | 7/2001 | Czaplicki |
| 6,270,600 B1 | 8/2001 | Wycech |
| 6,277,898 B1 | 8/2001 | Pachl et al. |
| 6,281,260 B1 | 8/2001 | Hanley et al. |
| 6,287,669 B1 | 9/2001 | George et al. |
| 6,296,298 B1 | 10/2001 | Barz |
| 6,303,672 B1 | 10/2001 | Papalos et al. |
| 6,311,452 B1 | 11/2001 | Barz et al. |
| 6,312,668 B2 | 11/2001 | Mitra et al. |
| 6,319,964 B1 | 11/2001 | Blank et al. |
| 6,348,513 B1 | 2/2002 | Hilborn et al. |
| 6,350,791 B1 | 2/2002 | Feichtmeier et al. |
| 6,358,584 B1 | 3/2002 | Czaplicki |
| 6,368,438 B1 | 4/2002 | Chang et al. |
| 6,376,564 B1 | 4/2002 | Harrison |
| 6,382,635 B1 | 5/2002 | Fitzgerald |
| 6,383,610 B1 | 5/2002 | Barz et al. |
| 6,403,222 B1 | 6/2002 | Harrison |
| 6,416,611 B1 | 7/2002 | Roberts et al. |
| 6,419,305 B1 | 7/2002 | Larsen |
| 6,429,244 B1 | 8/2002 | Rinka et al. |
| 6,432,475 B1 | 8/2002 | Yamamoto et al. |
| 6,437,055 B1 | 8/2002 | Moriarity et al. |
| 6,440,257 B1 | 8/2002 | Zhou et al. |
| 6,441,075 B2 | 8/2002 | Hirata et al. |
| 6,441,081 B1 | 8/2002 | Sadatoshi et al. |
| H2047 H | 9/2002 | Harrison et al. |
| 6,444,149 B1 | 9/2002 | Valentinsson |
| 6,444,713 B1 | 9/2002 | Pachl et al. |
| 6,448,338 B1 | 9/2002 | Born et al. |
| 6,451,231 B1 | 9/2002 | Harrison et al. |
| 6,451,876 B1 | 9/2002 | Koshy |
| 6,455,146 B1 | 9/2002 | Fitzgerald |
| 6,455,476 B1 | 9/2002 | Imai et al. |
| 6,455,634 B1 | 9/2002 | Khandpur et al. |
| 6,467,834 B1 | 10/2002 | Barz et al. |
| 6,471,285 B1 | 10/2002 | Czaplicki et al. |
| 6,479,560 B2 | 11/2002 | Freitag et al. |
| 6,482,486 B1 | 11/2002 | Czaplicki et al. |
| 6,486,256 B1 | 11/2002 | Tarbutton et al. |
| 6,489,400 B2 | 12/2002 | Khandpur et al. |
| 6,506,494 B2 | 1/2003 | Brandys et al. |
| 6,546,693 B2 | 4/2003 | Wycech |
| 6,548,593 B2 | 4/2003 | Merz et al. |
| 6,561,571 B1 | 5/2003 | Brennecke |
| 6,573,309 B1 | 6/2003 | Reitenbach et al. |
| 6,586,089 B2 | 7/2003 | Golden |
| 6,589,621 B1 | 7/2003 | Beckerdite et al. |
| 6,593,380 B2 | 7/2003 | Gehlsen et al. |
| 6,607,831 B2 | 8/2003 | Ho et al. |
| 6,617,366 B2 | 9/2003 | Sueda et al. |
| 6,620,501 B1 | 9/2003 | Kassa et al. |
| 6,634,698 B2 | 10/2003 | Kleino |
| 6,668,457 B1 | 12/2003 | Czaplicki |
| 6,682,818 B2 | 1/2004 | Czaplicki et al. |
| 6,692,347 B1 | 2/2004 | Schneider |
| 6,706,772 B2 | 3/2004 | Czaplicki et al. |
| 6,706,802 B2 | 3/2004 | Carlson et al. |
| 6,718,442 B1 | 4/2004 | Hilborn et al. |
| 6,722,720 B2 | 4/2004 | Donick et al. |
| 6,730,713 B2 | 5/2004 | Czaplicki |
| 6,740,067 B2 | 5/2004 | Leise et al. |
| 6,740,379 B1 | 5/2004 | Congard et al. |
| 6,740,399 B1 | 5/2004 | George et al. |
| 6,753,379 B1 | 6/2004 | Kawate et al. |
| 6,774,171 B2 | 8/2004 | Kassa et al. |
| 6,776,869 B1 * | 8/2004 | Schenkel ............... C08G 18/10 156/330 |
| 6,777,079 B2 | 8/2004 | Zhou et al. |
| 6,787,065 B1 | 9/2004 | Schapira et al. |
| 6,787,579 B2 | 9/2004 | Czaplicki et al. |
| 6,787,593 B2 | 9/2004 | Bell et al. |
| 6,787,605 B2 | 9/2004 | Clough et al. |
| 6,787,606 B1 | 9/2004 | Chen |
| 6,790,597 B2 | 9/2004 | Dershem et al. |
| 6,790,906 B2 | 9/2004 | Chaignon et al. |
| 6,797,371 B1 | 9/2004 | Gehlsen et al. |
| 6,800,157 B2 | 10/2004 | Tarbutton et al. |
| 6,800,680 B2 | 10/2004 | Stark et al. |
| 6,805,768 B2 | 10/2004 | Agarwal et al. |
| 6,806,320 B2 | 10/2004 | Everaerts et al. |
| 6,811,864 B2 | 11/2004 | Czaplicki et al. |
| 6,820,923 B1 | 11/2004 | Bock |
| 6,824,451 B2 | 11/2004 | Hollatz et al. |
| 6,838,509 B2 | 1/2005 | Shimo et al. |
| 6,846,559 B2 | 1/2005 | Czaplicki et al. |
| 6,884,854 B2 | 4/2005 | Schoenfeld et al. |
| 6,887,914 B2 | 5/2005 | Czaplicki et al. |
| 6,890,964 B2 | 5/2005 | Czaplicki et al. |
| 6,894,082 B2 | 5/2005 | Brantl et al. |
| 6,911,109 B2 | 6/2005 | Giroux et al. |
| 6,920,693 B2 | 7/2005 | Hankins et al. |
| 6,955,593 B2 | 10/2005 | Lewis et al. |
| 6,991,237 B2 | 1/2006 | Kassa et al. |
| 7,008,680 B2 | 3/2006 | Everaerts et al. |
| 7,071,263 B2 | 7/2006 | Cheng et al. |
| 7,084,209 B2 | 8/2006 | Everaerts et al. |
| 7,084,210 B2 | 8/2006 | Eagle |
| 7,094,843 B2 | 8/2006 | Meyer |
| 7,119,149 B2 | 10/2006 | Ferguson et al. |
| 7,125,461 B2 | 10/2006 | Czaplicki et al. |

(56) References Cited

U.S. PATENT DOCUMENTS

| | | | |
|---|---|---|---|
| 7,169,467 B2 | 1/2007 | Wilson | |
| 7,199,165 B2 | 4/2007 | Kassa et al. | |
| 7,297,740 B2 | 11/2007 | Dyksterhouse | |
| 7,392,929 B1 | 7/2008 | Finerman et al. | |
| 7,438,782 B2 | 10/2008 | Sheasley et al. | |
| 7,467,452 B2 | 12/2008 | Lande et al. | |
| 7,494,179 B2 | 2/2009 | Deachin | |
| 7,503,620 B2 | 3/2009 | Brennecke et al. | |
| 7,892,396 B2 | 2/2011 | Sheasley | |
| 7,926,179 B2 | 4/2011 | Gray et al. | |
| 2002/0013389 A1 | 1/2002 | Taylor et al. | |
| 2002/0115737 A1* | 8/2002 | Freitag et al. | 521/135 |
| 2002/0123575 A1 | 9/2002 | Kato et al. | |
| 2002/0164450 A1 | 11/2002 | Lupini et al. | |
| 2002/0182955 A1* | 12/2002 | Weglewski et al. | 442/59 |
| 2002/0192387 A1 | 12/2002 | Agarwal et al. | |
| 2003/0045620 A1 | 3/2003 | Carlson et al. | |
| 2003/0050352 A1 | 3/2003 | Guenther et al. | |
| 2003/0144416 A1* | 7/2003 | Tarbutton et al. | 525/65 |
| 2003/0159773 A1* | 8/2003 | Tomiyama et al. | 156/248 |
| 2003/0183317 A1 | 10/2003 | Czaplicki et al. | |
| 2003/0186049 A1 | 10/2003 | Czaplicki et al. | |
| 2003/0195268 A1* | 10/2003 | Freitag et al. | 521/130 |
| 2004/0016677 A1 | 1/2004 | Ward et al. | |
| 2004/0048078 A1 | 3/2004 | Czaplicki et al. | |
| 2004/0058181 A1 | 3/2004 | Garnault et al. | |
| 2004/0079478 A1 | 4/2004 | Merz | |
| 2004/0180193 A1 | 9/2004 | Oda et al. | |
| 2004/0181013 A1 | 9/2004 | Schenkel | |
| 2004/0197545 A1 | 10/2004 | Gehlsen et al. | |
| 2004/0204551 A1 | 10/2004 | Czaplicki et al. | |
| 2004/0229000 A1 | 11/2004 | Khandpur et al. | |
| 2004/0266898 A1 | 12/2004 | Kassa et al. | |
| 2005/0016677 A1 | 1/2005 | Carlson et al. | |
| 2005/0020703 A1 | 1/2005 | Czaplicki et al. | |
| 2005/0022929 A1 | 2/2005 | Schoenfeld et al. | |
| 2005/0081383 A1 | 4/2005 | Kosal et al. | |
| 2005/0103422 A1 | 5/2005 | Kawaguchi | |
| 2005/0119372 A1 | 6/2005 | Czaplicki et al. | |
| 2005/0154089 A1 | 7/2005 | Taylor et al. | |
| 2005/0159511 A1 | 7/2005 | Kramer | |
| 2005/0159531 A1 | 7/2005 | Ferng et al. | |
| 2005/0172486 A1 | 8/2005 | Carlson et al. | |
| 2005/0221046 A1 | 10/2005 | Finerman et al. | |
| 2005/0230027 A1 | 10/2005 | Kassa et al. | |
| 2005/0241756 A1 | 11/2005 | Harthcock et al. | |
| 2005/0279567 A1 | 12/2005 | Ito | |
| 2006/0021697 A1 | 2/2006 | Riley | |
| 2006/0057333 A1 | 3/2006 | Brahim | |
| 2006/0090343 A1 | 5/2006 | Riley et al. | |
| 2006/0155045 A1 | 7/2006 | Tsuno et al. | |
| 2006/0171269 A1 | 8/2006 | Hiramatsu | |
| 2006/0188726 A1 | 8/2006 | Muenz et al. | |
| 2006/0252860 A1 | 11/2006 | Ui et al. | |
| 2007/0045042 A1 | 3/2007 | Barz et al. | |
| 2007/0087848 A1 | 4/2007 | Larsen et al. | |
| 2007/0088138 A1 | 4/2007 | Czaplicki et al. | |
| 2007/0090560 A1 | 4/2007 | Kassa et al. | |
| 2007/0095475 A1 | 5/2007 | Hable | |
| 2007/0101679 A1 | 5/2007 | Harthcock et al. | |
| 2007/0116961 A1 | 5/2007 | Connell et al. | |
| 2007/0117874 A1 | 5/2007 | Kassa et al. | |
| 2007/0122510 A1 | 5/2007 | Mendiboure | |
| 2007/0134058 A1 | 6/2007 | Meyer et al. | |
| 2007/0138683 A1 | 6/2007 | Hideki et al. | |
| 2007/0264438 A1 | 11/2007 | Kawai | |
| 2007/0282081 A1 | 12/2007 | Ichiroku | |
| 2007/0284036 A1 | 12/2007 | Sheasley | |
| 2008/0029200 A1 | 2/2008 | Sheasley | |
| 2008/0060742 A1 | 3/2008 | Sheasley et al. | |
| 2008/0241576 A1 | 10/2008 | Le Gall et al. | |
| 2008/0308212 A1* | 12/2008 | Sheasley et al. | 156/78 |
| 2008/0311405 A1 | 12/2008 | Wang et al. | |
| 2009/0269547 A1 | 10/2009 | Meyer et al. | |
| 2010/0025147 A1 | 2/2010 | Kassa | |
| 2010/0272908 A1* | 10/2010 | Sturgill | C09J 163/00 427/386 |
| 2011/0036497 A1* | 2/2011 | Lammerschop | C09J 11/08 156/330 |
| 2012/0186721 A1 | 7/2012 | Preghenella | |

FOREIGN PATENT DOCUMENTS

| | | |
|---|---|---|
| DE | 19919783 A1 | 11/2000 |
| EP | 0360214 A2 | 3/1990 |
| EP | 0383498 A2 | 8/1990 |
| EP | 0442178 A1 | 8/1991 |
| EP | 0710696 A2 | 5/1996 |
| EP | 0730999 A1 | 9/1996 |
| EP | 0819723 A1 | 1/1998 |
| EP | 0893332 A1 | 1/1999 |
| EP | 1022320 A1 | 7/2000 |
| EP | 1055699 A1 | 11/2000 |
| EP | 1072647 A2 | 1/2001 |
| EP | 1123348 A2 | 8/2001 |
| EP | 1031496 B1 | 12/2001 |
| EP | 1182087 A2 | 2/2002 |
| EP | 0703931 B1 | 10/2003 |
| EP | 1387683 A2 | 11/2003 |
| EP | 1240266 B1 | 2/2004 |
| EP | 0851894 B1 | 4/2004 |
| EP | 1272587 B1 | 5/2004 |
| EP | 1155084 B1 | 6/2004 |
| EP | 1431325 A1 | 6/2004 |
| EP | 1075498 B1 | 7/2004 |
| EP | 0820491 B1 | 8/2004 |
| EP | 0947529 B1 | 8/2004 |
| EP | 1185595 A2 | 8/2004 |
| EP | 1252217 B1 | 8/2004 |
| EP | 1449868 A1 | 8/2004 |
| EP | 1023413 B1 | 9/2004 |
| EP | 1155082 B1 | 9/2004 |
| EP | 1305376 B1 | 9/2004 |
| EP | 1155053 B1 | 10/2004 |
| EP | 1163308 B1 | 10/2004 |
| EP | 1471105 A2 | 10/2004 |
| EP | 1001893 B1 | 11/2004 |
| EP | 1115770 B1 | 11/2004 |
| EP | 1187888 B1 | 11/2004 |
| EP | 1591224 A1 | 2/2005 |
| EP | 1574537 A1 | 9/2005 |
| EP | 1123348 B1 | 12/2005 |
| EP | 1602702 A1 | 12/2005 |
| EP | 1458594 B1 | 3/2006 |
| EP | 1666228 A2 | 6/2006 |
| EP | 1506265 B1 | 7/2006 |
| EP | 1578838 B1 | 8/2006 |
| EP | 1609831 B1 | 8/2006 |
| EP | 1453925 B1 | 10/2006 |
| GB | 903146 A | 8/1962 |
| JP | S52-5056 | 1/1977 |
| JP | 56-004432 A | 1/1981 |
| JP | 57-117542 A | 7/1982 |
| JP | 60-096681 A | 5/1985 |
| JP | 62-062882 A | 3/1987 |
| JP | S63280785 A | 11/1988 |
| JP | H02147618 A | 6/1990 |
| JP | 04-059819 A | 2/1992 |
| JP | 05-065391 | 3/1993 |
| JP | 06-166852 | 6/1994 |
| JP | 06166852 A * | 6/1994 |
| JP | 09-176616 A | 7/1997 |
| JP | 09-249730 A | 9/1997 |
| JP | 09-316169 A | 12/1997 |
| JP | 10-045031 A | 2/1998 |
| JP | 11-106544 A | 4/1999 |
| JP | 2001-62833 A | 3/2001 |
| JP | 2001191949 A | 7/2001 |
| JP | 2002-362412 A | 12/2002 |
| JP | 2004315688 A | 11/2004 |
| JP | 2005187508 A | 7/2005 |
| JP | 2006-520848 | 9/2014 |
| WO | 1995/033785 A1 | 12/1995 |
| WO | 1997/002967 A1 | 1/1997 |

(56) References Cited

FOREIGN PATENT DOCUMENTS

| | | |
|---|---|---|
| WO | 1997/012929 A1 | 4/1997 |
| WO | 1997/019124 A1 | 5/1997 |
| WO | 1998/036944 A1 | 8/1998 |
| WO | 1998/052997 A1 | 11/1998 |
| WO | 1998/053008 A1 | 11/1998 |
| WO | 1999/002578 A1 | 1/1999 |
| WO | 2000/003894 A1 | 1/2000 |
| WO | 2000/012571 A1 | 3/2000 |
| WO | 2000/012595 A1 | 3/2000 |
| WO | 2000/013876 A1 | 3/2000 |
| WO | 2000/020483 A2 | 4/2000 |
| WO | 2000/027920 A1 | 5/2000 |
| WO | 2000/037242 A1 | 6/2000 |
| WO | 2000/037554 A1 | 6/2000 |
| WO | 2000/039232 A1 | 7/2000 |
| WO | 2000/040629 A1 | 7/2000 |
| WO | 2000/052086 A2 | 9/2000 |
| WO | 2001/019667 A1 | 3/2001 |
| WO | 2001/057130 A1 | 8/2001 |
| WO | 2001/071225 A1 | 9/2001 |
| WO | 2001/088033 A1 | 11/2001 |
| WO | 2002/070620 A1 | 9/2002 |
| WO | 2002/088214 A1 | 11/2002 |
| WO | 2003/011954 A1 | 2/2003 |
| WO | 2003/040051 A1 | 5/2003 |
| WO | 2003/051676 A1 | 6/2003 |
| WO | 2003/054069 A1 | 7/2003 |
| WO | 2003/058340 A1 | 7/2003 |
| WO | 2003/059997 A1 | 7/2003 |
| WO | 2003/072677 A1 | 9/2003 |
| WO | 2003078163 A1 | 9/2003 |
| WO | 2003/095575 A1 | 11/2003 |
| WO | 2004/050740 A1 | 6/2004 |
| WO | 2004/055092 A1 | 7/2004 |
| WO | 2004/060956 A1 | 7/2004 |
| WO | 2004/060984 A1 | 7/2004 |
| WO | 2004/062869 A2 | 7/2004 |
| WO | 2004/065485 A1 | 8/2004 |
| WO | 2004/076507 A2 | 9/2004 |
| WO | 2004/078853 A2 | 9/2004 |
| WO | 2004/0078853 A2 | 9/2004 |
| WO | 2004/085510 A1 | 10/2004 |
| WO | 2004/085564 A1 | 10/2004 |
| WO | 2004/099312 A1 | 11/2004 |
| WO | 2005/002950 A2 | 1/2005 |
| WO | 2005/007720 A1 | 1/2005 |
| WO | 2005/044630 A1 | 5/2005 |
| WO | 2005/047393 A1 | 5/2005 |
| WO | 2005/090431 A1 | 9/2005 |
| WO | 2005/090455 A1 | 9/2005 |
| WO | 2005/095484 A1 | 10/2005 |
| WO | 2005/105405 A1 | 11/2005 |
| WO | 2005/108456 A1 | 11/2005 |
| WO | 2005/113627 A1 | 12/2005 |
| WO | 2006/074394 A2 | 7/2006 |
| WO | 2006/128722 | 12/2006 |
| WO | 2006/131190 A1 | 12/2006 |
| WO | 2007/025007 | 3/2007 |
| WO | 2007/050658 A1 | 5/2007 |
| WO | 2008/014053 | 1/2008 |
| WO | 2008/014053 A2 | 1/2008 |
| WO | WO 2008045270 A1 * | 4/2008 ............ C09J 11/08 |
| WO | 2008/157129 A1 | 12/2008 |
| WO | 2009/124709 A1 | 10/2009 |
| WO | 2011/012997 A2 | 2/2011 |
| WO | 2011/109699 A1 | 9/2011 |

OTHER PUBLICATIONS

Communication of a Notice of Opposition dated Jun. 13, 2017, Application No. 09725901.8.
Communication of Notices of Opposition dated Jul. 12, 2017, Application No. 097259501.8.
Reply of the Patent Proprietor to the Notice(s) of Opposition dated Nov. 21, 2017, Application No. 09729501.8.
Written Submission in Preparation to/During Oral Proceedings dated Aug. 3, 2018, Application No. EP09729501.8.
Written Submission in Preparation to/During Oral Proceedings dated Oct. 26, 2018, Application No. EP09729501.8.
Notice of Appeal dated Feb. 11, 2019, Application No. EP2268752B1.
Withdrawal of Appeal dated Apr. 15, 2019, Application No. EP2268752B1.
International Preliminary Report on Patentability dated Oct. 12, 2010; for Corresponding PCT Application No. PCT/EP2009/002546 filed Apr. 7, 2009.
International Search Report dated Jul. 14, 2009; for Corresponding PCT Application No. PCT/EP2009/002546 filed Apr. 7, 2009.
Corresponding PCT Application No. PCT/EP2009/002546 filed Apr. 7, 2009; Published as WO 2009/124709 A1 on Oct. 15, 2009.
Search Report dated Oct. 15, 2008; for Corresponding Application No. GB0806434.7 filed Apr. 9, 2008.
Corresponding No. GB0806434.7 filed Apr. 9, 2008; Published as WO 2009/124709 A1 on Oct. 15, 2009.
*The Epoxy Book* Published by Systems Three Resins, Inc. Seattle, Washington (2000).
"Epoxy Resins" Second Edition Encyclopedia of Polymer Science and Engineering, vol. 6, pp. 322-382 (1985).
Born et al. "Structural Bonding in Automotive Applications" (Apr. 2004).
Dvorko, "One-Part Epoxy Compounds and Derived Foam Plastics", published Apr. 13, 2004.
Zalobsky et al., "Recommendations on Selection and Use of Cavity Reinforcement Materials" Proceedings of the 1999 Noise and Vibration Conference.
Weber et al., "Characterizing the in Vehicle Performance of Expandable Sealants Used as Acoustic Baffles", Proceedings of the 1999 Noise and Vibrations Conference.
Weber et al., "Requirements for Improved Performance of Specialty Sealing and Bonding Materials for Automotive Applications", SAE 2000 World Congress, Mar. 6-9, 2000.
Liu et al., "Validation of Epoxy Foam for Structural and Crash Application", 2004 SAE World Congress, Mar. 8-11, 2004.
Schulenburg et al., "Structural Adhesives—Improvements in Vehicle Crash Performance", 2004 SAE World Congress, Mar. 8-11, 2004.
Casey et al., "Expandable Epoxy Foam: A Systematic Approach to Improve Vehicle Performance", 2004 SAE World Congress, Mar. 8-11, 2004.
Lilley et al., Vehicle Acoustic Solutions. (May 5-8, 2003).
Related U.S. Appl. No. 11/188,679, filed Jul. 25, 2005; Issued as U.S. Pat. No. 6,392,929 on Jul. 1, 2008.
Related U.S. Appl. No. 11/189,190, filed Jul. 26, 2005; Published as US 2006/0021697 A1 on Feb. 2, 2006.
Related U.S. Appl. No. 11/254,129, filed Oct. 19, 2005; Published as US 2006/0090343 A1 on May 4, 2006.
Related U.S. Appl. No. 11/339,431, filed Jan. 25, 2006; Issued as U.S. Pat. No. 7,467,452 on Dec. 23, 2008.
Related U.S. Appl. No. 11/390,658, filed Mar. 28, 2006; Issued as U.S. Pat. No. 7,494,179 on Feb. 24, 2009.
Related U.S. Appl. No. 11/391,884, filed Mar. 29, 2006; Published as US 2007-0122510 A1 on May 31, 2007.
Related U.S. Appl. No. 11/339,535, filed Mar. 30, 2006; Published as US 2006-0171269 A1 on Aug. 3, 2006.
Related U.S. Appl. No. 11/393,431, filed Mar. 30, 2006; Published as US 2007-0134058 A1 on Jul. 14, 2007.
Related U.S. Appl. No. 11/401,207, filed Apr. 10, 2006; Published as US 2007-0087848 A1 on Apr. 19, 2007.
Related U.S. Appl. No. 11/381,769, filed May 5, 2006; Issued as U.S. Pat. No. 7,503,620 on Mar. 17, 2009.
Related U.S. Appl. No. 11/422,705, filed Jun. 7, 2006; Issued as U.S. Pat. No. 7,438,782 on Oct. 21, 2008.
Related U.S. Appl. No. 10/597,610, filed Aug. 1, 2006; Published as US 2008-0241576 A1 on Oct. 2, 2008.
Related U.S. Appl. No. 11/461,557, filed Aug. 1, 2006; Issued as U.S. Pat. No. 7,926,179 on Apr. 19, 2011.
Related U.S. Appl. No. 11/467,185, filed Aug. 10, 2006; Published as US 2007-0045042 A1 on Mar. 1, 2007.

(56) References Cited

OTHER PUBLICATIONS

Related U.S. Appl. No. 10/867,835, filed Jun. 15, 2004; Issued as U.S. Pat. No. 7,199,165 on Apr. 3, 2007.
Related Patent Application No. PCT/US04/20112, filed Jun. 23, 2004; Published as WO 2005/002950 on Jan. 13, 2005.
Related Patent Application No. US 2011/027166, filed Mar. 4, 2011; Published as WO 2011/109699 on Sep. 9, 2011.
Related U.S. Appl. No. 13/387,192, filed Apr. 4, 2012; Published as US 2012-0186721 A1 on Jul. 26, 2012.
Related U.S. Appl. No. 11/551,035, filed Oct. 19, 2006; Published as US 2007-0090560 A1 on Apr. 26, 2007.

\* cited by examiner

STRUCTURAL ADHESIVES

CLAIM OF BENEFIT OF FILING DATE

The present application claims the benefit of the filing date of PCT Application Serial No. PCT/EP2009/002546 (filed Apr. 7, 2009) (Published as WO 2009/124709) and GB 0806434.7 (filed Apr. 9, 2008), the contents of which are hereby incorporated by reference in their entirety.

The present invention relates to improvements in or relating to activatable structural adhesives and in particular to structural adhesives that are used for bonding components in the automotive and aircraft industries although the adhesives have uses in other industries.

The present invention relates to the provision of an improved activatable material, and articles incorporating the same. The activatable material assists in providing various properties including structural reinforcement, adhesion, sealing, acoustical damping properties or a combination thereof within a cavity of, or upon a surface of a structure, or to one or more structural members (e.g., a body panel or structural member) of an article of manufacture (e.g., an automotive vehicle or an aircraft) particularly within a weld flange. As used herein, the phrase activatable material includes any material that may be activated to cure (e.g., thermoset), and optional melt, flow, expand, foam or a combination thereof by an ambient condition or another condition. The material will cure and may in addition expand, foam, flow, melt, a combination thereof or the like upon exposure to a condition such a heat, pressure, chemical exposure, combinations thereof or the like.

Activatable structural adhesives are used in weld seams and weld flanges in automotive vehicles and are also used in hem flanges. In some instances a continuous band of structural adhesive is provided to supplement the strength of sections that have been spot welded. Welding is a time consuming and expensive process and in a typical automotive assembly line several hundreds of spot welds may be required. Furthermore, it is sometimes not possible to weld dissimilar materials such as steel and aluminium and it is also not possible to weld certain polymers and polymer composites. There is therefore an incentive not only to increase the strength of the welded segment but also to reduce the number of welds that are required in any particular location.

Structural adhesives are also used to improve the stiffness of automobiles so reducing the likelihood of vehicle roll over, improving vehicle ride characteristics and increasing vehicle durability and fatigue life.

The activatable material of the present invention may be applied to various articles of manufacture for adding structural integrity to portions or members of articles or for sealing the articles. Examples of such articles of manufacture include, without limitation, household or industrial appliances, furniture, storage containers, buildings, structures or the like. In preferred embodiments, the activatable material is applied to portions of an automotive vehicle or aircraft such as body or frame members (e.g., a vehicle frame rail) of the automotive vehicle.

In one embodiment the material of the present invention may be an expandable material although unexpandable materials are more common. Where the material is expandable the invention includes applying the activatable material to a surface of a structure in an unexpanded or partially expanded state and activating the material for expanding (e.g., foaming) it to a volume greater than its volume in the unexpanded state (e.g., at least 5% greater, at least 50% greater, at least 200% greater. It is also typically preferred at least for reinforcement applications that the volumetric expansion such that the expanded volume is less than 400%, more typically less than 300%, even more typically less than 200% and possibly less than 100% relative to the original unexpanded volume. It is also contemplated that the volume of the material may be less after activation due to curing (e.g., cross-linking) for foamed or unfoamed versions of the activatable material.

Structural adhesives are required to be resistant to impact and not to fracture under conditions that may be experienced in an accident such as an automobile crash. They are also required to function over the wide temperature range to which they may be subjected typically −40° C. to 90° C. although higher temperatures may be experienced. Current structural adhesives suffer from an undesirable reduction in their adhesive properties at low temperatures, particularly at temperatures below 0° C. In addition, current structural adhesives often begin to lose strength at higher temperatures, particularly greater than 70° C.

The performance required of a structural adhesive is good Lap Shear, high T Peel and good performance in the Wedge Impact Test over the range of temperatures and environmental conditions. Other desirable properties include good adhesion durability under various types of exposure conditions such as high humidity, salt water and high and low temperatures with maintenance of the physical properties over time. In certain applications a high elastic modulus, a high Tg, high strain to failure and other physical properties may be desired.

The present invention provides an adhesive formulation that satisfies these requirements and overcomes the problems of current structural adhesives.

The present invention therefore provides an adhesive formulation comprising
  i) an adduct of an epoxy resin and an elastomer;
  ii) a phenoxy resin;
  iii) a core/shell polymer;
  iv) a curing agent.

The adhesive formulations may contain other ingredients according to the use to which the formulation is to be put.

The Adduct

The epoxy elastomer adduct imports flexibility to the activatable adhesive and the ability to initiate plastic deformation. Various epoxy/elastomer adducts may be employed in the present invention. The epoxy/elastomer hybrid or adduct may be included in an amount of up to about 50% by weight of the activatable material. The epoxy elastomer adduct is approximately at least 5%, more typically at least 7% and even more typically at least 10% by weight of the activatable material and more preferably about 5% to 20% by weight of the adduct based on the activatable material. The elastomer-containing adduct may be a combination of two or more particular adducts and the adducts may be solid adducts, liquid adducts or semi-solids at a temperature of 23° C. or may also be combinations thereof. In one preferred embodiment, the adduct is composed of substantially entirely (i.e., at least 70%, 80%, 90% or more) of one or more adducts that are solid at a temperature of 23° C. We have found unexpectedly that when the adduct is used together with the core/shell polymer and the phenoxy resin desirable adhesive performance can be achieved over a wide range of temperatures employing a relatively small amount of the adduct. This lower amount of adduct such as 5% to 15% by weight imparts high temperature stability to the structural adhesive since there is little undesirable lowering of the Tg of the formulation.

The adduct itself generally includes about 1:5 to 5:1 parts of epoxy to elastomer, and more preferably about 1:3 to 3:1 parts of epoxy to elastomer. More typically, the adduct includes at least about 10%, more typically at least about 20% and even more typically at least about 40% elastomer and also typically includes not greater than about 60%, although higher or lower percentages are possible. The elastomer compound suitable for the adduct may be a thermosetting elastomer, although not required. Exemplary elastomers include, without limitation, natural rubber, styrene-butadiene rubber, polyisoprene, polyisobutylene, polybutadiene, isoprene-butadiene copolymer, neoprene, nitrile rubber (e.g., a butyl nitrile, such as carboxy-terminated butyl nitrile), butyl rubber, polysulfide elastomer, acrylic elastomer, acrylonitrile elastomers, silicone rubber, polysiloxanes, polyester rubber, diisocyanate-linked condensation elastomer, EPDM (ethylene-propylene diene rubbers), chlorosulphonated polyethylene, fluorinated hydrocarbons and the like. In one embodiment, recycled tire rubber is employed. Examples of additional or alternative epoxy/elastomer or other adducts suitable for use in the present invention are disclosed in United States Patent Publication 2004/0204551.

The elastomer-containing adduct is included to modify structural properties of the activatable material such as strength, toughness, stiffness, flexural modulus, or the like. Additionally, the elastomer-containing adduct may be selected to render the activatable material more compatible with coatings such as water-borne paint or primer system or other conventional coatings.

Phenoxy Resins

Phenoxy resins are high molecular weight thermoplastic condensation products of bisphenol A and epichloro-hydrin and their derivatives. Typically the phenoxy resins that are employed are of the basic formula

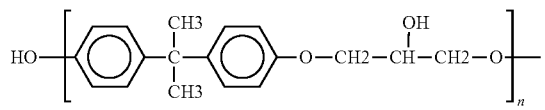

where n is typically from 30 to 100 preferably from 50 to 90. Modified phenoxy resins may also be used. Examples of phenoxy resins that may be used are the products marketed by Inchem Corp. Examples of suitable materials are the PKHB, PKHC, PKHH, PKHJ, PKHP pellets and powder. Alternatively phenoxy/polyester hybrids and epoxy/phenoxy hybrids may be used. In order to enhance the production of the activatable material it is preferred that the phenoxy resin be supplied to the other components as a solution. While any solvent may be used it is particularly preferred to use a liquid epoxy resin as the solvent as this can also contribute to the adhesive properties upon activation. When the structural adhesive is to be applied as a past we prefer to use no more than 20% by weight of the phenoxy resin as higher amounts can result in too high a viscosity. However, higher percentages are effective for materials that are solid prior to activation.

The Core/Shell Polymer

As used herein, the term core/shell polymer denotes a polymeric material wherein a substantial portion (e.g., greater than 30%, 50%, 70% or more by weight) thereof is comprised of a first polymeric material (i.e., the first or core material) that is substantially entirely encapsulated by a second polymeric material (i.e., the second or shell material). The first and second polymeric materials, as used herein, can be comprised of one, two, three or more polymers that are combined and/or reacted together (e.g., sequentially polymerized) or may be part of separate or same core/shell systems. The core/shell polymer should be compatible with the formulation and preferably has a ductile core and a rigid shell which is compatible with the other components of the structural adhesive formulation.

The first and second polymeric materials of the core/shell polymer can include elastomers, polymers, thermoplastics, copolymers, other components, combinations thereof or the like. In preferred embodiments, the first polymeric material, the second polymeric material or both include or are substantially entirely composed of (e.g., at least 70%, 80%, 90% or more by weight) one or more thermoplastics. Exemplary thermoplastics include, without limitation, styrenics, acrylonitriles, acrylates, acetates, polyamides, polyethylenes or the like.

Preferred core/shell polymers are formed by emulsion polymerization followed by coagulation or spray drying. It is also preferred for the core/shell polymer to be formed of or at least include a core-shell graft co-polymer. The first or core polymeric material of the graft copolymer preferably has a glass transition temperature substantially below (i.e., at least 10, 20, 40 or more degrees centigrade) the glass transition temperature of the second or shell polymeric material. Moreover, it may be desirable for the glass transition temperature of the first or core polymeric material to be below 23° C. while the glass temperature of the second or shell polymeric material to be above 23° C., although not required.

Examples of useful core-shell graft copolymers are those where hard containing compounds, such as styrene, acrylonitrile or methyl methacrylate, are grafted onto a core made from polymers of soft or elastomeric compounds such as butadiene or butyl acrylate. U.S. Pat. No. 3,985,703, describes useful core-shell polymers, the cores of which are made from butyl acrylate but can be based on ethyl isobutyl, 2-ethylhexyl or other alkyl acrylates or mixtures thereof. The core polymer, may also include other copolymerizable containing compounds, such as styrene, vinyl acetate, methyl methacrylate, butadiene, isoprene, or the like. The core polymer material may also include a cross linking monomer having two or more nonconjugated double bonds of approximately equal reactivity such as ethylene glycol diacrylate, butylene glycol dimethacrylate, and the like. The core polymer material may also include a graft linking monomer having two or more nonconjugated double bonds of unequal reactivity such as, for example, diallyl maleate and allyl methacrylate.

The shell portion is preferably polymerized from methyl acrylates such as methyl methacrylate and optionally other alkyl acrylates and methacrylates, such as ethyl, butyl, or mixtures thereof acrylates or methacrylates as these materials are compatible with the phenoxy resin and any epoxy resins that are used in the formulation. Up to 40 percent by weight or more of the shell monomers may be styrene, vinyl acetate, vinyl chloride, and the like. Additional core-shell graft copolymers useful in embodiments of the present invention are described in U.S. Pat. Nos. 3,984,497; 4,096, 202; 4,034,013; 3,944,631; 4,306,040; 4,495,324; 4,304, 709; and 4,536,436. Examples of core-shell graft copolymers include, but are not limited to, "MBS" (methacrylate-butadiene-styrene) polymers, which are made by polymerizing methyl methacrylate in the presence of polybutadiene or a polybutadiene copolymer rubber. The MBS graft copolymer resin generally has a styrene butadiene rubber core and a shell of acrylic polymer or copolymer. Examples of other useful core-shell graft copolymer resins include, ABS (acrylonitrile-butadiene-styrene), MABS (methacrylate-acrylonitrile-butadiene-styrene), ASA (acrylate-styrene-acrylonitrile), all acrylics, SA EPDM (styrene-acrylonitrile grafted onto elastomeric backbones of ethylene-propylene diene monomer), MAS (methacrylic-acrylic rubber styrene), and the like and mixtures thereof.

Examples of useful core/shell polymers include, but are not limited to those sold under the tradename, PARALOID, commercially available from Rohm & Haas Co. One particularly preferred grade of PARALOID impact modifier has a polymethyl methacrylate shell and an MBS core modifier and is sold under the designation EXL-2650; the product E-950 solid by Akema may also be used with equal effectiveness. We prefer to use from 5% to 30% of the core shell polymer particularly when the adhesive is to be applied as a paste as higher amounts can lead to an undesirably high viscosity.

Curing Agent

One or more curing agents are included in the activatable material of this invention. Optionally curing agent accelerators may also be included. The amounts of curing agents and curing agent accelerators used can vary widely depending upon the type of structure desired, the desired structural properties of the activatable material and the like and in the embodiment when the material is expandable the desired amount of expansion of the activatable material and the desired rate of expansion. Exemplary ranges for the curing agents or curing agent accelerators present in the activatable material range from about 0.001% by weight to about 7% by weight.

Preferably, the curing agents assist the activatable material in curing by crosslinking of the polymers, phenoxy epoxy resins or both and any epoxy resin that may be present. It is also preferable for the curing agents to assist in thermosetting the activatable material. Useful classes of curing agents are materials selected from aliphatic or aromatic amines or their respective adducts, amidoamines, polyamides, cycloaliphatic amines, anhydrides, polycarboxylic polyesters, isocyanates, phenol-based resins (e.g., phenol or cresol novolak resins, copolymers such as those of phenol terpene, polyvinyl phenol, or bisphenol-A formaldehyde copolymers, bishydroxyphenyl alkanes or the like), or mixtures thereof. Particular preferred curing agents include modified and unmodified polyamines or polyamides such as triethylenetetramine, diethylenetriamine tetraethylenepentamine, cyanoguanidine, dicyandiamides and the like. If an accelerator for the curing agent is used examples of materials includes a modified or unmodified urea such as methylene diphenyl bis urea, an imidazole or a combination thereof.

The compositions of this invention may contain other ingredients such as one or more of the following
i) epoxy resins;
ii) polymers;
iii) blowing agent;
iv) filler;
v) flow control materials and
vi) nano particles.

Epoxy Resin

The preferred formulations of the present invention include epoxy resins both as solvent for the phenoxy resin and also as a component of the formulation. Epoxy resin is used herein to mean any of the conventional dimeric, oligomeric or polymeric epoxy materials containing at least one epoxy functional group. Important current epoxy content is more than 40%. Moreover, the term epoxy resin can be used to denote one epoxy resin or a combination of multiple epoxy resins. The polymer-based materials may be epoxy-containing materials having one or more oxirane rings polymerizable by a ring opening reaction. In preferred embodiments, the activatable material includes between about 2% and 75% by weight epoxy resin, more preferably between about 4% and 60% by weight epoxy resin and even more preferably between about 25% and 50% by weight epoxy resin. Of course, amounts of epoxy resin may be greater or lower depending upon the intended application of the activatable material.

The epoxy may be aliphatic, cycloaliphatic, aromatic or the like. The epoxy may be supplied as a solid (e.g., as pellets, chunks, pieces or the like) or a liquid (e.g., an epoxy resin) although liquid resins are preferred to enhance processability of the adhesive formulation. As used herein, unless otherwise stated, a resin is a solid resin if it is solid at a temperature of 23° C. and is a liquid resin if it is a liquid at 23° C. The epoxy may include an ethylene copolymer or terpolymer. As a copolymer or terpolymer, the polymer is composed of two or three different monomers, i.e., small molecules with high chemical reactivity that are capable of linking up with similar molecules.

An epoxy resin may be added to the activatable material to increase the adhesion, flow properties or both of the material. One exemplary epoxy resin may be a phenolic resin, which may be a novolac type or other type resin. Other preferred epoxy containing materials may include a bisphenol-A epichlorohydrin ether polymer, or a bisphenol-A epoxy resin which may be modified with butadiene or another polymeric additive or bisphenol-F-type epoxy resins. Moreover, various mixtures of several different epoxy resins may be employed as well. Examples of suitable epoxy resins are sold under the tradename Araldite GY 282, GY 281 and GY 285 supplied by Huntsman.

Polymer or Copolymer

Depending upon the use to which the activatable material is to be put, it may include one or more additional polymers or copolymers, which can include a variety of different polymers, such as thermoplastics, elastomers, plastomers and combinations thereof or the like. For example, and without limitation, polymers that might be appropriately incorporated into the structural adhesive include halogenated polymers, polycarbonates, polyketones, urethanes, polyesters, silanes, sulfones, allyls, olefins, styrenes, acrylates, methacrylates, epoxies, silicones, phenolics, rubbers, polyphenylene oxides, terphthalates, acetates (e.g., EVA), acrylates, methacrylates (e.g., ethylene methyl acrylate polymer) or mixtures thereof. Other potential polymeric materials may be or may include, without limitation, polyolefin (e.g., polyethylene, polypropylene) polystyrene, polyacrylate, poly(ethylene oxide), poly(ethyleneimine), polyester, polyurethane, polysiloxane, polyether, polyphosphazine, polyamide, polyimide, polyisobutylene, polyacrylonitrile, poly(vinyl chloride), poly(methyl methacrylate), poly(vinyl acetate), poly(vinylidene chloride), polytetrafluoroethylene, polyisoprene, polyacrylamide, polyacrylic acid, polymethacrylate.

When used, these polymers can comprise a small portion or a more substantial portion of the material. When used, the one or more additional polymers preferably comprises about 0.1% to about 50%, more preferably about 1% to about 20% and even more preferably about 2% to about 10% by weight of the activatable material.

In certain embodiments, it may be desirable to include one or more thermoplastic polyethers and/or thermoplastic epoxy resins in the activatable material. When included, the one or more thermoplastic polyethers preferably comprise between about 1% and about 90% by weight of the activatable material, more preferably between about 3% and about 60% by weight of the activatable material and even more preferably between about 4% and about 25% by weight of the activatable material. As with the other materials, however, more or less thermoplastic polyether may be employed depending upon the intended use of the activatable material.

The thermoplastic polyethers typically include pendant hydroxyl moieties. The thermoplastic polyethers may also include aromatic ether/amine repeating units in their backbones. The thermoplastic polyethers of the present invention preferably have a melt index between about 5 and about 100, more preferably between about 25 and about 75 and even more preferably between about 40 and about 60 grams per 10 minutes for samples weighing 2.16 Kg at a temperature of about 190° C. Of course, the thermoplastic polyethers may have higher or lower melt indices depending upon their intended application. Preferred thermoplastic polyethers include, without limitation, polyetheramines, poly(amino ethers), copolymers of monoethanolamine and diglycidyl ether, combinations thereof or the like.

Preferably, the thermoplastic polyethers are formed by reacting an amine with an average functionality of 2 or less (e.g., a difunctional amine) with a glycidyl ether (e.g., a diglycidyl ether). As used herein, the term difunctional amine refers to an amine with an average of two reactive groups (e.g., reactive hydrogens).

According to one embodiment, the thermoplastic polyether is formed by reacting a primary amine, a bis(secondary) diamine, a cyclic diamine, a combination thereof or the like (e.g., monoethanolamine) with a diglycidyl ether or by reacting an amine with an epoxy-functionalized poly(alkylene oxide) to form a poly(amino ether). According to another embodiment, the thermoplastic polyether is prepared by reacting a difunctional amine with a diglycidyl ether or diepoxy-functionalized poly(alkylene oxide) under conditions sufficient to cause the amine moieties to react with the epoxy moieties to form a polymer backbone having amine linkages, ether linkages and pendant hydroxyl moieties. Optionally, the polymer may be treated with a monofunctional nucleophile which may or may not be a primary or secondary amine.

Additionally, it is contemplated that amines (e.g., cyclic amines) with one reactive group (e.g., one reactive hydrogen) may be employed for forming the thermoplastic polyether. Advantageously, such amines may assist in controlling the molecular weight of the thermoplastic ether formed.

Examples of preferred thermoplastic polyethers and their methods of formation are disclosed in U.S. Pat. Nos. 5,275,853; 5,464,924 and 5,962,093. Advantageously, the thermoplastic polyethers can provide the activatable material with various desirable characteristics such as desirable physical and chemical properties for a wide variety of applications as is further described herein.

Although not required, the formulation may include one or more ethylene polymers or copolymers such as ethylene acrylates, ethylene acetates or the like. Ethylene methacrylate and ethylene vinyl acetate are two preferred ethylene copolymers.

It may also be desirable to include a reactive polyethylene resin that is modified with one or more reactive groups such as glycidyl methacrylate or maleic anhydride. Examples of such polyethylene resins are sold under the tradename LOTADER® (e.g., LOTADER AX 8900) and are commercially available from Arkema Group.

Blowing Agent

The invention envisages both non-expandable and expandable adhesives although non-expandable materials are more typical. If the activatable material is expandable one or more blowing agents may be added to the activatable material for producing inert gasses that form, as desired, an open and/or closed cellular structure within the activatable material. In this manner, it may be possible to lower the density of articles fabricated from the material. In addition, the material expansion can help to improve sealing capability, acoustic damping and adhesion to bonding substrate.

The blowing agent may include one or more nitrogen containing groups such as amides, amines and the like. Examples of suitable blowing agents include azodicarbonamide, dinitrosopentamethylenetetramine, azodicarbonamide, dinitrosopentamethylenetetramine, 4,4,-oxy-bis-(benzenesulphonylhydrazide), trihydrazinotriazine and N,N,-dimethyl-N,N,-dinitrosoterephthalamide. An accelerator for the blowing agents may also be provided in the activatable material. Various accelerators may be used to increase the rate at which the blowing agents form inert gasses. One preferred blowing agent accelerator is a metal salt, or is an oxide, e.g. a metal oxide, such as zinc oxide. Other preferred accelerators include modified and unmodified thiazoles or imidazoles.

Amounts of blowing agents and blowing agent accelerators can vary widely within the activatable material depending upon the type of cellular structure desired, the desired amount of expansion of the activatable material, the desired rate of expansion and the like. Exemplary ranges for the amounts of blowing agents and blowing agent accelerators in the activatable material range from about 0.001% by weight to about 5% by weight and are preferably in the activatable material in fractions of weight percentages.

Filler

The activatable material may also include one or more fillers, including but not limited to particulate materials (e.g., powder), beads, microspheres such as Zeospheres available from Zeelan Industries, or the like. Preferably the filler includes a material that is generally non-reactive with the other components present in the activatable material. While the fillers may generally be present within the activatable material to take up space at a relatively low weight, it is contemplated that the fillers may also impart properties such as strength and impact resistance to the activatable material.

Examples of fillers include silica, diatomaceous earth, glass, clay (e.g., including nanoclay), talc, pigments, colorants, glass beads or bubbles, glass, carbon or ceramic fibers, nylon or polyamide fibers (e.g., Kevlar), antioxidants, and the like. Such fillers, particularly clays, can assist the activatable material in leveling itself during flow of the material. The clays that may be used as fillers may include clays from the kaolinite, illite, chloritem, smecitite or sepiolite groups, which may be calcined. Examples of suitable fillers include, without limitation, talc, vermiculite, pyrophyllite, sauconite, saponite, nontronite, montmorillonite or mixtures thereof. The clays may also include minor amounts of other ingredients such as carbonates, feldspars, micas and quartz. The fillers may also include ammonium chlorides such as dimethyl ammonium chloride and dimethyl benzyl ammonium chloride. Titanium dioxide might also be employed.

In one preferred embodiment, one or more mineral or stone type fillers such as calcium carbonate, sodium carbonate or the like may be used as fillers. In another preferred embodiment, silicate minerals such as mica may be used as fillers.

When employed, the fillers in the activatable material can range from 10% or less to 90% or greater by weight of the activatable material, but more typical from about 20 to 55% by weight of the activatable material. According to some embodiments, the activatable material may include from about 0% to about 3% by weight, and more preferably slightly less that 1% by weight clays or similar fillers. Powdered (e.g. about 0.01 to about 50, and more preferably about 1 to 25 micron mean particle diameter) mineral type filler can comprise between about 5% and 70% by weight, more preferably about 10% to about 50% by weight.

Other Components and Additives

It is contemplated that most nearly any additional chemicals, materials or otherwise may be added to the activatable material assuming they are suitable for the activatable material and suitable for a chosen application of the activatable material.

Other additives, agents or performance modifiers may also be included in the activatable material as desired, including but not limited to an antioxidant, a UV resistant agent, a flame retardant, an impact modifier, a heat stabilizer, a colorant, a processing aid, a lubricant, a reinforcement (e.g., chopped or continuous glass, ceramic, aramid, or carbon fiber, particulates or the like). Liquid polysulfides may be used to improve the environmental exposure of the adhesive such as exposure to humidity and salt water.

When determining appropriate components for the activatable material, it may be important to form the material such that it will only activate (e.g., flow, foam or otherwise change states) at appropriate times or temperatures. For instance, in some applications, it is undesirable for the material to be reactive at room temperature or otherwise at the ambient temperature in a production environment. More typically, the activatable material becomes activated to flow at higher processing temperatures. As an example, temperatures such as those encountered in an automobile assembly plant may be appropriate, especially when the activatable material is processed along with the other components at elevated temperatures or at higher applied energy levels, e.g., during painting preparation steps. Temperatures encountered in many coating operations (e.g., in a paint and/or e-coat curing oven), for instance, range up to about 250° C. or higher.

The relative proportions of the materials that should be used will depend upon the use envisaged for the activatable material. However for most applications we prefer that the composition contain from 3% to 25% by weight of the epoxy/elastomer adduct, from 3% to 20% of the phenoxy resin and from 5% to 30% of the core/shell polymer; 1% to 10% of a curing agent. Preferred amounts of the other optional ingredients are as follows; 5% to 75% of one or more epoxy resins, preferably a liquid epoxy resin, 0.2% to 3% of a cure accelerator, 0.1% to 50% mineral filler, 0.1% to 3.0% clay and/or silica.

Formation and Application of the Activatable Material

Formation of the activatable material can be accomplished according to a variety of new or known techniques. However, it is contemplated that various blending techniques may be used to increase or decrease the concentration of certain components in certain locations of the activatable material.

According to one embodiment, the activatable material is formed by supplying the epoxy elastomer adduct and the core/shell polymer in solid form such as pellets, chunks and the like and blending with a solution of the phenoxy resin preferably in a liquid epoxy resin. Alternatively, a masterbatch of the phenoxy resin and the core/shell polymer may be prepared in a solvent such as a liquid epoxy resin, the fillers may then be added optionally with additional liquid epoxy resin and finally the curing agent and optionally any curing agent accelerator are added and mixed, preferably under vacuum to remove any entrapped air. The components are typically combined in one or more blenders such as large bins or other containers. Preferably, the containers can be used to intermix the components by rotating or otherwise moving the container. Thereafter, heat, pressure or a combination thereof may be applied to soften or liquidize the solid components such that the components can be intermixed by stirring or otherwise into a single homogenous composition.

According to another embodiment, the activatable material may be formed by heating one or more of the components that are generally easier to soften or liquidize such as the polymer based materials to induce those components into a mixable state. Thereafter, the remaining components may be intermixed with the softened components.

It is important to assure that the temperature of the components remains below the curing temperature once the curing agents have been added. Additionally, when the activatable material contains a blowing agent, it is typically desirable to maintain the temperature of the activatable material below a temperature that will activate the blowing agent during formation of the activatable material or before the activatable material is applied to a surface. In situations where it is desirable to maintain the activatable material at lower temperatures it may be desirable to maintain the components in a semi-solid or viscoelastic state using pressure or a combination of pressure and heat to intermix the components of the activatable material. Various machines have been designed to applying heat, pressure or both to materials.

In use the activatable material of the present invention is typically applied to a surface or substrate and activated to cure the adhesive activation typically occurs at elevated temperatures in the range 140° C. to 200° C. The time required depending upon the temperature employed with 30 minutes being typical. Activation of the material may also include at least some degree of foaming or bubbling in situations where the activatable material includes a blowing agent. Such foaming or bubbling can assist the activatable material in wetting a substrate and forming an intimate bond with the substrate. Alternatively, however, it shall be recognized that the activatable material may be activated to flow without foaming or bubbling and may still substantially wet the substrate to form an intimate bond. Formation of the intimate bond will typically but not necessarily occur upon curing of the activatable material.

Depending upon the intended application, the activatable material may be applied and activated in different ways and at different times. The material may be formed into a strip and applied by hand or mechanically to wherever it is to be used. Alternatively the material can be applied as a liquid or a paste and may be pumped from a drum. The material may be extruded onto the position where it is used. Thus, exemplary uses of the activatable material are discussed below to illustrate preferred methodologies of application and activation of the activatable material. In particular, the activatable material may be used for, amongst others, reinforcement, sealing and adhering or the like.

Reinforcement

The activatable material may be used to reinforce structural members of an article of manufacture. When used for reinforcement, the activatable material may be employed by itself, it may be employed in conjunction with other materials (e.g., a backing), may be applied to a carrier member or the like. The activatable material is particularly useful to provide added strength to metal welds such as weld flanges and may be applied between pieces of metal that are subsequently welded together. In some instances the material may be used to replace the need for welds.

According to one embodiment, the activatable material of the present invention is applied to a carrier member to form a reinforcement member and the reinforcement member is inserted within a cavity formed by a structural member of an automotive vehicle. The structural member of the automotive vehicle may be nearly any member of the vehicle including, but not limited to, frame members, body member, pillar structures, closure panels, roof assemblies, bumpers, combinations thereof or the like.

The carrier member may be selected from a variety of conventional and novel configurations. The activatable material of the present invention may thus be applied to a carrier member, such as a molded, extruded or stamped member (e.g., metal or plastic, foamed or unfoamed; exemplary materials of which include aluminum, magnesium, titanium, steel, molding compound (e.g., sheet or bulk molding compound), polyamide (e.g., nylon 6 or nylon 6,6), polysulfone, thermoplastic imide, polyether imide, polyether sulfone or mixtures thereof.

The activatable materials of the present invention have been found to be effective structural adhesives which have desirable performance over an extended temperature range particularly in the Wedge Impact Test. The materials have been found to maintain their adhesive properties over an extended period of time and to be effective in humid or salt spray environments. They are useful for structural bonding in a variety of applications such as the automotive, aircraft, aerospace, railroad vehicles, trucks, busses, sports goods, construction and furniture industries. They have been found to be particularly useful in reinforcing welded areas and in some instances to avoid the need to weld in areas that have hitherto been welded.

The present invention is illustrated by reference to the following examples in which the following materials were first prepared.

40% of the phenoxy resin PKHJ from Inchem Corp was dissolved in 60% of the Bisphenol F liquid epoxy resin Epalloy 8220 from CVC Speciality Chemicals held at 180° C. The mixture was stirred in a high speed mixer for about 30 minutes. 50 wt % of this product was then mixed with 50% of the commercial material Paraloid EXL 2650 from Rohm and Haas to produce a masterbatch with the purpose of properly dispersing the Paraloid.

An epoxy elastomer adduct was prepared by reacting 60% of the Bisphenol A based Epoxy resin Araldite 6071 with 20% of each of the two liquid elastomers Hycar 1300×8 and Hycar 1300×13 available from Emerald.

The lap shear test is a modification of ASTM D-1002 and involves taking two galvanized steel coupons, dispensing the adhesive in between the metal coupons and curing the material. The bondline is the thickness of the material. The overlap area of the two pieces of metal in this case is 12.5 mm×25 mm. The metal coupons are gripped in a mechanical testing machine and pulled apart. The maximum stress is measured by dividing the peak load by the overlap area.

The T-peel test is a modification of ASTM D-1876 in which two galvanized steel coupons are bent to an L-shape. Uncured adhesive is dispensed onto the long part of the coupon. The two metal coupons are put together to make a T-shape. The metal coupons are cured to create a T-shaped test specimen. The bondline is the thickness of the cured material. The overlap area with adhesive is 25 mm by 100 mm. The two legs of the T-shape are put into testing grips in a mechanical testing machine and pulled apart. The average force per material width is calculated from this test.

EXAMPLE 1

The following formulation was prepared.

| Ingredient | Grams |
| --- | --- |
| Masterbatch | 105 |
| Epoxy elastomer adduct | 30 |
| Epalloy 8220 | 140 |
| Kaneka MX 136 | 12 |
| (25% core/shell polymer dissolved in 75% Bisphenol F epoxy resin) | |
| Dicydianamide (Amicure CG 1200) | 20 |
| Omicure 52 | 2 |
| Calcibrite OG calcium carbonate | 75 |
| Nanopox 510 | 20 |
| (40% nano particle size silica in 60% Bisphenol F epoxy resin) | |

Masterbatch and the adduct are placed into a sigma blade mixer/extruder, the Nanopox and the Kaneka are then added followed by the calcium carbonate and the epoxy resin. Finally the dicydianamide and the omicure are added and the materials mixed for about 15 minutes and a vacuum is applied to remove any entrapped air.

The adhesive properties of the formulation were tested by measuring the average T-peel strength at room temperature, the lap shear at room temperature and the wedge impact strength over the temperature range −40° C. to 90° C. The lap shear was measured employing 1.8 mm thick galvanised steel coupons as the substrate. The glass transition temperature of the cured adhesive was 131.4° C.

The results of the tests were as follows.

| T-peel | 9.35 N/mm |
| --- | --- |
| Lap shear | 35.4 MPa |
| Wedge impact | |
| 90° C. | 36.9 N/mm |
| 23° C. | 33.0 N/mm |
| −30° C. | 22.3 N/mm |
| −40° C. | 21.6 N/mm |

The results show a relatively low drop in wedge impact from 90° C. to −40° C.; considerably less than current automotive crash durable adhesives where the high temperature value can be at least three times the low temperature value. Typical −40° C. values are below 20 N/mm. This low temperature performance coupled with the high Tg has significant benefits.

EXAMPLE 2

A similar formulation to that of Example 1 was prepared except that an additional 5 grams of the Kaneka MX 136 solution replaced 5 grams of the masterbatch.

In order to measure the extent of the high temperature degradation of the adhesive properties the lap shear strength (in MPa) was measured over the temperature range of −30° C. to 90° C. using 45 mm wide, 0.8 mm thickness with a 10 mm overlap. The results were as follows.

| Temperature ° C. | Lap Shear Strength |
|---|---|
| −30 | 25.8 |
| 0 | 23.6 |
| 30 | 21.9 |
| 60 | 21.5 |
| 90 | 20.2 |

The results show that the shear strength is largely retained a high temperature showing unusually consistent performance over a broad temperature range.

The difference in values between Example 1 and 2 may be attributed to the difference in the thickness of the test substrate.

EXAMPLE 3

The following formulation was prepared in a manner similar to Example 1.
Omicure 52—5 grams
Dicydianamide (Amicure CG 1200)–20 grams
40% phenoxy/60% Bisphenol Epoxy resin dissolution–80 grams
Araldite GY 282—90 grams
Paraloid EXL 2650—50 grams
Epoxy resin elastomer adduct (70%), Hycar 1300×31 (30%)—80 grams
The adhesive had the following properties
Lap shear: 36.8 MPa
T-peel: 11.33 N/mm
Wedge Impact −30 C, 27.24 N/mm
Wedge Impact −40 C, 25.5 N/mm

EXAMPLE 4

The following formulation was prepared in a manner similar to Example 1.
Omicure 52—5 grams
Dicydianamide (Amicure CG 1200)—20 grams
40% phenoxy/60% Bisphenol Epoxy resin dissolution—75 grams
Epalloy 8220—110 grams
Paraloid EXL 2650—75 grams
Epoxy elastomer adduct (2-types of solid epoxy, 4-type solid epoxy equal mix) 70%, Hycar 1300×31 (30%)
Zeospeheres 1200: 30 grams
The adhesive had the following properties
Lap shear: 34.06 MPa
T-peel: 8.75 N/mm
Wedge Impact—30 C, 44.93 N/mm
Wedge Impact—40 C, 38.36 N/mm

EXAMPLE 5

The following formulation was prepared in a manner similar to Example 1.
Omicure 52—5 grams
Dicydianamide (Amicure CG 1200)—20 grams
40% phenoxy/60% Bisphenol Epoxy resin dissolution—52.5 grams
Epalloy 8220—120 grams
Paraloid EXL 2650—52.5 grams
Epoxy elastomer adduct (60%), Hycar 1300×13 (20%), Hycar 1300×8 (20%)—30 grams
Calibrite OG—75 grams
Thioplast EPS15 (polysulfide)—20 grams
Kaneka 135—10 grams
Nanopox 510—20 grams
The adhesive had the following properties
Lap shear: 34.84 MPa
T-peel: 10.42 N/mm
Wedge Impact −30 C, 22.9 N/mm
Wedge Impact −40 C, 21.28 N/mm
The Lap shear test in examples 3 to 5 employed:
Metal—Galvanized Steel
Coupon size: 25 mm×100 mm×1.8 mm
Overlap: 12.5 mm
Bondline thickness: 0.3 mm
Oil: Quaker N6130
T-Peel test in examples 3 to 5 employed:
Metal—Galvanized Steel
Coupon size—100 mm×25 mm×0.7 mm
Bondline thickness—0.3 mm
Oil: None.
The Wedge Impact test employed:
Metal—Electrogalvanised Steel
Thickness—0.2 mm

The invention claimed is:

1. An adhesive formulation comprising:
   i) an adduct of an epoxy resin and an elastomer, wherein the adhesive formulation contains from about 7% to about 20% by weight of the adduct based on the adhesive formulation;
   ii) a phenoxy epoxy hybrid resin supplied as a solution formed by dissolving a phenoxy resin in a liquid epoxy resin to form a pre-formed dissolution product;
   iii) a core/shell polymer, wherein the adhesive formulation contains from 5% to 30% by weight of the core/shell polymer;
   iv) a curing agent; and
   v) one or more additional epoxy resins;
   wherein the adhesive formulation includes between about 55% by weight and about 70% by weight total epoxy resin, wherein the total epoxy resin is the liquid epoxy resin of the phenoxy epoxy hybrid resin and the one or more additional epoxy resins;
   wherein the adhesive formulation is a liquid or a paste at room temperature;
   wherein the adhesive formulation contains between 3% to 10% by weight of the phenoxy resin so that the adhesive formulation is pumpable;
   wherein the adhesive formulation functions over a temperature range of about −40° C. to about 90° C.; and
   wherein the adhesive formulation has a strength when cured in the wedge impact test at −40° C. of greater than 20 N/mm.

2. The adhesive formulation according to claim 1, wherein the formulation contains from about 7% to about 15% by weight of the adduct based on the adhesive formulation.

3. The adhesive formulation according to claim 1, wherein the adduct includes about 1:5 to 5:1 parts of epoxy to elastomer.

4. The adhesive formulation according to claim 1, wherein the elastomer in the adduct is selected from a group consisting of: natural rubber, styrene-butadiene rubber, polyisoprene, polyisobutylene, polybutadiene, isoprene-butadiene copolymer, neoprene, nitrile rubber, butyl rubber, polysulfide elastomer, acrylic elastomer, acrylonitrile elastomers, silicone rubber, polysiloxanes, polyester rubber, diisocyanate-linked condensation elastomer, ethylene-propylene diene rubbers, chlorosulphonated polyethylene, fluorinated hydrocarbons, and any combination thereof.

5. The adhesive formulation according to claim 4, wherein the adduct of the epoxy resin and the elastomer is derived from a butadiene acrylonitrile rubber.

6. The adhesive formulation according to claim 1, wherein the phenoxy resin is of the formula

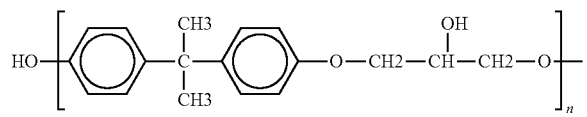

where n is from 30 to 100.

7. The adhesive formulation according to claim 1, wherein the formulation provides added strength to metal welds including weld flanges.

8. The adhesive formulation according to claim 1, wherein the core/shell polymer has a ductile core and a rigid shell which is compatible with the other components of the formulation.

9. The adhesive formulation according to claim 1, in which the core/shell polymer includes materials selected from a group consisting of: styrenics, acrylonitriles, acrylates, acetates, polyamides, polyethylenes, and any combination thereof.

10. The adhesive formulation according to claim 1, wherein the core/shell polymer is a graft copolymer in which styrene, acrylonitrile, or methyl methacrylate, are grafted onto a core polymer made from polymers of soft or elastomeric compounds.

11. The adhesive formulation according to claim 10, wherein the core polymer includes other copolymerizable containing compounds, selected from styrene, vinyl acetate, methyl methacrylate, butadiene, and isoprene.

12. The adhesive formulation according to claim 10, wherein the core polymer includes a cross linking monomer having two or more nonconjugated double bonds.

13. The adhesive formulation according to claim 10, wherein a shell portion of the core/shell polymer is polymerized from alkyl acrylates and/or methacrylates.

14. The adhesive formulation according to claim 1, wherein the curing agent is selected from aliphatic or aromatic amines or their respective adducts, amidoamines, polyamides, cycloaliphatic amines, anhydrides, polycarboxylic polyesters, isocyanates, phenol-based resins, and mixtures thereof.

15. The adhesive formulation according to claim 14, in which the curing agent is selected from modified and unmodified polyamines or polyamides.

16. The adhesive formulation according to claim 1, wherein the formulation contains between 7% and 15% by weight of the liquid epoxy resin of the phenoxy epoxy hybrid resin.

17. The adhesive formulation according to claim 1, wherein the formulation contains one or more liquid poly sulfides.

18. The adhesive formulation according to claim 1, comprising from about 1% to about 10% by weight of the curing agent.

19. The adhesive formulation according to claim 18, comprising about 0.2% to about 3% by weight of a cure accelerator, about 0.1% to about 50% by weight mineral filler, and about 0.1% to about 3.0% by weight clay and/or silica.

20. The adhesive formulation according to claim 15, wherein the curing agent is selected from one or more of triethylenetetramine, diethylenetriamine tetraethylenepentamine, cyanoguanidine, and dicyandiamides.

21. An adhesive formulation comprising:
  i) an adduct of an epoxy resin and an elastomer, wherein the formulation contains from about 7% to about 15% by weight of the adduct based on the adhesive formulation, and wherein the adduct includes about 1:5 to 5:1 parts of epoxy to elastomer;
  ii) a phenoxy epoxy hybrid resin supplied as a solution formed by dissolving a phenoxy resin in a liquid epoxy resin to form a pre-formed dissolution product;
  iii) a core/shell polymer, wherein the adhesive formulation contains from 5% to 30% by weight of the core/shell polymer;
  iv) a curing agent; and
  v) one or more additional epoxy resins;
    wherein the adhesive formulation includes between about 55% by weight and about 70% by weight total epoxy resin, wherein the total epoxy resin is the liquid epoxy resin of the phenoxy epoxy hybrid resin and the one or more additional epoxy resins;
    wherein the adhesive formulation is a liquid or a paste at room temperature;
    wherein the adhesive formulation contains between 3% to 10% by weight of the phenoxy resin so that the adhesive formulation is pumpable;
    wherein the adhesive formulation functions over a temperature range of about −40° C. to about 90° C.; and
    wherein the adhesive formulation has a strength when cured in the wedge impact test at −40° C. of greater than 20 N/mm.

* * * * *

UNITED STATES PATENT AND TRADEMARK OFFICE
CERTIFICATE OF CORRECTION

PATENT NO. : 11,248,145 B2  
APPLICATION NO. : 12/936777  
DATED : February 15, 2022  
INVENTOR(S) : Michael Czaplicki Page 1 of 1

It is certified that error appears in the above-identified patent and that said Letters Patent is hereby corrected as shown below:

On the Title Page

Item (56) delete "5,030,701 A 7/1991 Johnson et al." and insert --6,030,701 A 02/2000 Johnson et al.--

Page 2, item (56) delete "6,718,442 B1 4/2004 Hilborn et al." and insert --6,218,442 B1 04/2001 Hilborn et al.--

Page 3, item (56) FOREIGN PATENT DOCUMENTS, delete "EP 1387683 A2 11/2003" and insert --EP 1362683 A2 11/2003--

Page 4, item (56) FOREIGN PATENT DOCUMENTS, delete "WO 2003/040051 A1 5/2003" and insert --WO 2003/040251 A1 05/2003--

Page 4, item (56) FOREIGN PATENT DOCUMENTS, delete "WO 2004/0078853 A2 9/2004"

Signed and Sealed this  
Twenty-sixth Day of April, 2022

Katherine Kelly Vidal  
*Director of the United States Patent and Trademark Office*